(12) United States Patent
Hashimura et al.

(10) Patent No.: US 9,919,562 B2
(45) Date of Patent: Mar. 20, 2018

(54) PNEUMATIC TIRE

(71) Applicant: The Yokohama Rubber Co., Ltd., Tokyo (JP)

(72) Inventors: Yoshiaki Hashimura, Hiratsuka (JP); Takahiko Sawada, Hiratsuka (JP); Tomohiko Kogure, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 409 days.

(21) Appl. No.: 14/868,545

(22) Filed: Sep. 29, 2015

(65) Prior Publication Data

US 2016/0016432 A1    Jan. 21, 2016

Related U.S. Application Data

(62) Division of application No. 12/439,763, filed as application No. PCT/JP2007/067165 on Sep. 4, 2007.

(30) Foreign Application Priority Data

Sep. 5, 2006 (JP) ................................. 2006-240033

(51) Int. Cl.
  *B60C 5/14*   (2006.01)
  *B29D 30/06*  (2006.01)
  *B60C 1/00*   (2006.01)

(52) U.S. Cl.
  CPC ............ *B60C 5/14* (2013.01); *B29D 30/0681* (2013.01); *B60C 1/0008* (2013.01);
  (Continued)

(58) Field of Classification Search
  CPC ................ B60C 5/14; B60C 2005/145; B60C 2005/147; B60C 1/0008; B29D 30/0681; B29D 2030/0682
  See application file for complete search history.

(56) References Cited

U.S. PATENT DOCUMENTS 5,040,583 A    8/1991  Lin et al.
5,156,921 A   10/1992  Lin et al.
(Continued)

FOREIGN PATENT DOCUMENTS

EP          854054 A1    7/1998
JP        A 1-314164    12/1989
(Continued)

*Primary Examiner* — Michael H Wilson
*Assistant Examiner* — Philip N Schwartz
(74) *Attorney, Agent, or Firm* — Greer Burns & Crain Ltd.

(57) ABSTRACT

A pneumatic tire having an air impermeable layer. A film formed of a thermoplastic resin or thermoplastic elastomer composition comprising a blend of a thermoplastic resin and an elastomer is used for the air impermeable layer. Separation of the film is prevented and an inner appearance of the tire is improved.

The air impermeable layer 10, which is disposed on the inner side of the tire, is formed from a laminated body 14 comprising a ribbon-shaped film 11 and ribbon-shaped elastomer plies 12 and 13 laminated on opposite sides thereof. The laminated body 14 is wound in the circumferential direction of the tire in such a partially overlapping manner that it is displaced at prescribed intervals. Each pair of adjacent wound portions 14A and 14B of the laminated body 14 are spliced to each other in a partially overlapping manner in a state where the ribbon-shaped film 11 is disengaged from itself.

4 Claims, 2 Drawing Sheets

(52) U.S. Cl.
CPC .......................... *B29D 2030/0682* (2013.01); *B60C 2005/145* (2013.01); *B60C 2005/147* (2013.01)

(56) References Cited

U.S. PATENT DOCUMENTS

| | | |
|---|---|---|
| 5,292,590 A | 3/1994 | Lin et al. |
| 5,992,486 A | 11/1999 | Katsuki |

FOREIGN PATENT DOCUMENTS

| | | |
|---|---|---|
| JP | A 9-19987 | 1/1997 |
| JP | A 10-16509 | 1/1998 |
| JP | A 10-35232 | 2/1998 |
| JP | A 2002-18973 | 1/2002 |
| JP | A 2006-224854 | 8/2006 |
| JP | A 2007-296916 | 11/2007 |

PNEUMATIC TIRE

This application is a Divisional of application Ser. No. 12/439,763, filed Dec. 4, 2009, which is a U.S. National Phase under 35 U.S.C. § 371 of International Application No. PCT/JP2007/067165, filed Sep. 4, 2007.

TECHNICAL FIELD

The present invention relates to a pneumatic tire in which a film formed of a thermoplastic resin or thermoplastic elastomer composition comprising a blend of a thermoplastic resin and an elastomer is used for an air impermeable layer, and more particularly, to a pneumatic tire which can prevent separation of the film and improve an inner appearance of the tire.

TECHNICAL BACKGROUND

There have conventionally been known a pneumatic tire in which a film formed of a thermoplastic resin or thermoplastic elastomer composition comprising a blend of a thermoplastic resin and an elastomer is used for an air impermeable layer (inner liner) disposed on the inner side of the tire (see a patent document 1, for example).

The opposite ends of the film in the circumferential direction of the tire are spliced to each other in an overlapping manner to form the above air impermeable layer. However, the film having the thermoplastic resin as a main component has a low adhesion. Therefore, even if the opposite ends of the film are spliced by pressing, the spliced opposite ends of the film are separated from each other during building of a green tire, which creates a problem of a mold release agent, applied to the inner surface of the tire, which comes in between the opposite ends of the film from the separated place of the film during curing of the green tire. If the mold release agent comes in between the opposite ends of the film as described above, adhesion of the film between the opposite ends is lowered, whereby the film is opened between the opposite ends during running, and the opened part becomes a starting point of tire trouble.

Further, the above film is subject to blemish because it is soft under high temperatures. Therefore, when the curing bladder is folded in order to remove a tire from a tire curing press after curing, the film receives a blemish if the curing bladder comes into contact with the film on the inner side of the tire and is rubbed against the surface of the film, which produces a problem of deteriorating an inner appearance of a brand-new tire.

Patent Document 1; Japanese Patent Application Kokai Publication HEI 10-35232

DISCLOSURE OF THE INVENTION

Problems to be Solved by the Invention

An object of the present invention is to provide a pneumatic tire in which a film formed of a thermoplastic resin or thermoplastic elastomer composition comprising a blend of a thermoplastic resin and an elastomer is used for an air impermeable layer, capable of preventing separation of the film and of improving an inner appearance of the tire.

Means for Solving the Problems

In order to achieve the above object, the present invention provides a pneumatic tire having an air impermeable layer disposed on an inner side of the tire, the air impermeable layer being formed of a thermoplastic resin or thermoplastic elastomer composition comprising a blend of a thermoplastic resin and an elastomer, wherein: the film is formed from a ribbon-shaped film; the air impermeable layer is formed from a laminated body comprising the ribbon-shaped film and at least two ribbon-shaped elastomer plies laminated on opposite sides thereof, the laminated body being wound in a circumferential direction of the tire in such a partially overlapping manner that it is displaced at prescribed intervals; the wound laminated body has partially overlapping wound portions; and each pair of adjacent wound portions of the laminated body are spliced to each other in a partially overlapping manner in a state where the ribbon-shaped film is disengaged from itself.

Effects of the Invention

According to the present invention described above, the air impermeable layer is formed from a laminated body comprising a ribbon-shaped film and ribbon-shaped elastomer plies laminated on opposite sides thereof, and each pair of adjacent wound portions are spliced to each other in a state where the ribbon-shaped film is disengaged from itself. Therefore, the spliced parts of the adjacent wound portions can be prevented from easily separating from each other during building of a green tire. Accordingly, a mold release agent applied to the inner surface of the green tire does not come inside during curing of the green tire.

Since the ribbon-shaped elastomer plies are laminated on the film, the ribbon-shaped film is not exposed in the inner surface of the tire but one of the ribbon-shaped elastomer plies which are not easily subjected to blemishes is exposed. Therefore, occurrence of blemishes in the inner surface of the tire is avoided after curing, enabling an inner appearance of the tire to be improved.

Figure 1:
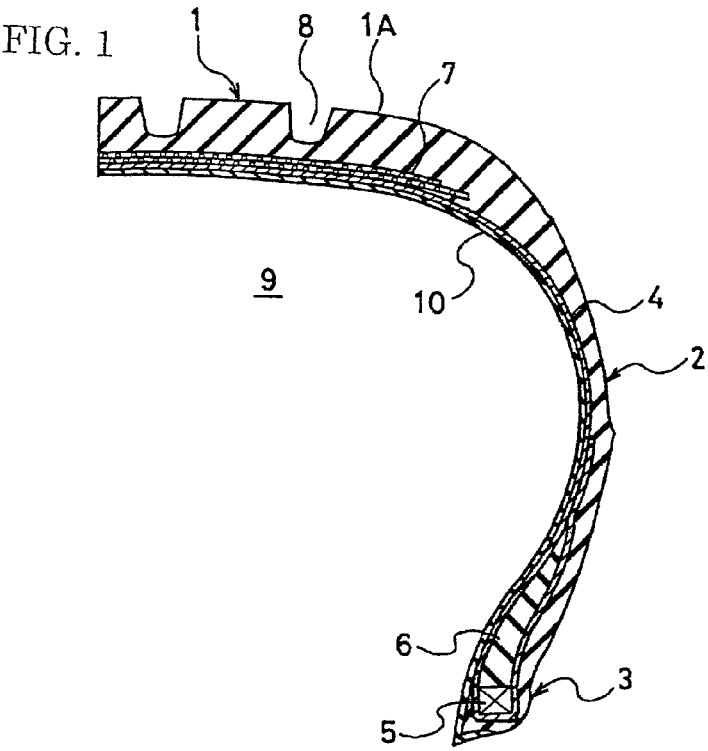
FIG. 1 is a partial cross-sectional view showing an embodiment of a pneumatic tire according to the present invention.

DESCRIPTION OF THE SYMBOLS 1 tread portion
2 sidewall portion
3 bead portion
10, 10A to 10E air impermeable layer
11 ribbon-shaped film
11$x$ one end
11$y$ the other end
12, 13 ribbon-shaped elastomer ply
12$x$, 13$x$ one end
12$y$, 13$y$ the other end
14 laminated body
14A, 14A1, 14A2 wound portion

BEST MODES FOR CARRYING OUT THE INVENTION

Embodiments of the present invention will be described in detail below with reference to the attached drawings.

Referring to FIG. 1, there is shown an embodiment of a pneumatic tire according to the present invention; reference numeral 1 denotes a tread surface, reference numeral 2 a sidewall portion, and reference numeral 3 a bead portion.

A carcass ply 4 extends between the right and left bead portions 3, the carcass ply having a rubber layer and reinforcing cords embedded therein, the reinforcing cords extending in the radial direction of the tire being arranged at prescribed intervals in the circumferential direction of the tire. The carcass ply has opposite ends, which are turned up around bead cores 3 embedded in the bead portions 3 from the inner side in the axial direction of the tire toward the outer side in the axial direction of the tire so as to sandwich bead fillers 6. A plurality of belt plies 7 are provided radially outwardly of the carcass ply 4 in the tread portion 1, the belt plies having rubber layers and reinforcing cords such as steel cords embedded therein, the reinforcing cords being arranged in an inclined manner with respect to the circumferential direction of the tire. The tread portion 1 has a tread surface 1A, which has circumferential grooves 8 extending in the circumferential direction of the tire. An air impermeable layer 10 for preventing permeation of air in the cavity 9 of the tire is placed inward of the carcass ply 4.

Figure 2:
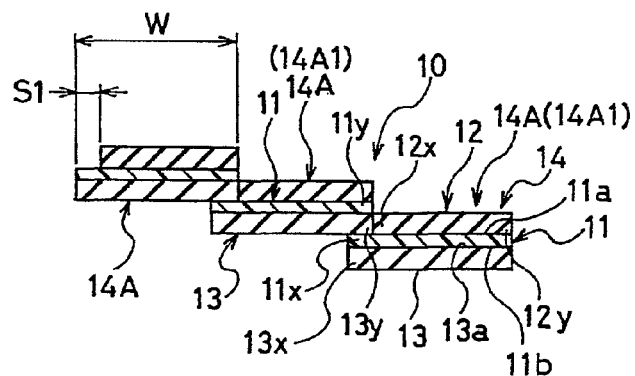
FIG. 2 is a partial enlarged cross-sectional view of an air impermeable layer in FIG. 1.

The air impermeable layer 10, that is disposed on the inner side of the tire beside the cavity 9 of the tire, is, as shown in FIG. 2, formed from a laminated body 14 having a three-layer structure comprising a ribbon-shaped narrow film 11 of a thermoplastic resin or thermoplastic elastomer composition comprising a blend of a thermoplastic resin and an elastomer and two ribbon-shaped narrow elastomer plies 12 and 13 laminated on the opposite sides of the film. The laminated body 14 is continuously and spirally wound in the circumferential direction of the tire in such a partially overlapping manner that it is displaced at prescribed intervals in the radial direction of the tire in the sidewall portions 2 and in the widthwise direction of the tire in the tread portion 1. The wound laminated body 14 has partially overlapping wound portions 14A.

The ribbon-shaped film 11 includes opposite ends comprising one end 11x on one side of the laminated body 14 in the widthwise direction thereof and the other end 11y on the other side of the laminated body 14 in the widthwise direction thereof. One ribbon-shaped elastomer ply 12 also includes opposite ends comprising one end 12x on the one side of the laminated body 14 in the widthwise direction thereof and the other end 12y on the other side of the laminated body 14 in the widthwise direction thereof. The other ribbon-shaped elastomer ply 13 also includes opposite ends comprising one end 13x on the one side of the laminated body 14 in the widthwise direction thereof and the other end 13y on the other side of the laminated body 14 in the widthwise direction thereof.

The one ribbon-shaped elastomer ply 12 of the two ribbon-shaped elastomer plies 12 and 13 is less in width than the ribbon-shaped film 11, and the other ribbon-shaped elastomer ply 13 has the same width as the ribbon-shaped film 11. The ribbon-shaped film 11 is laminated on the outer surface 13a of the other ribbon-shaped elastomer ply 13 in an entirely overlapping manner. The one ribbon-shaped elastomer ply 12 is laminated on the outer surface 11a of the laminated ribbon-shaped film 11 in such an entirely overlapping manner that the one end 12x thereof is offset inward in the widthwise direction of the laminated body 14 relative to the one end 11x of the ribbon-shaped film 11. The other ribbon-shaped elastomer ply 13 is disposed inward of the ribbon-shaped film 11, and faces the cavity 9 of the tire.

Each pair of adjacent wound portions 14A1 and 14A2 of the laminated body 14 are partially overlapped with each other in a state where the one end 11x of the ribbon-shaped film 11 and the other end 13y of the other ribbon-shaped elastomer ply 13 are spliced to each other in a directly overlapping manner and the one end 11x and the other end 11y of the ribbon-shaped film 11 are disengaged from each other. When viewed from the tire inner side, the ribbon-shaped film 11 is placed such that the one end 11x and the other end 11y disengaged from each other are overlapped with each other, whereby air is not easily permeated between the ends 11x and 11y of the ribbon-shaped film 11.

For the thermoplastic resin used for the ribbon-shaped film 11, conventionally known ones (see Japanese Patent Application Kokai Publication HEI 10-35232, for example) can be used; examples of the thermoplastic resin may include polyamide resins, polyester resins and ethylene-vinylalcohol copolymer resins, and examples of the elastomer blended with the thermoplastic resin may include diene rubbers and olefin rubbers. In order to enhance adhesion to the ribbon-shaped elastomer plies 12 and 13, an adhesive layer may be provided on each surface of the ribbon-shaped film 11.

For an elastomer used for the ribbon-shaped elastomer plies 12 and 13, any elastomer may be used if it has a good adhesion to the rubber of the carcass ply 4 and the film 11. Examples of the elastomer preferably include diene rubbers and olefin rubbers.

According to the present invention described above, since the adjacent wound portions 14A1 and 14A2 of the laminated body 14 constituting the air impermeable layer 10 are arranged such that the one end 11x of the ribbon-shaped film 11 and the other end 13y of the other ribbon-shaped elastomer ply 13 are spliced to each other in an overlapping manner and the one end 11x and the other end 11y of the ribbon-shaped film 11 are not spliced to each other, the spliced ends 11x and 13y of the ribbon-shaped film 11 and ribbon-shaped elastomer ply 13 are not easily separated during building of a green tire. Therefore, a mold release agent applied to the inner surface of the green tire can be prevented from coming inside when the green tire is cured.

Since the ribbon-shaped elastomer plies 12 and 13 are laminated on the opposite sides of the ribbon-shaped film 11, the inner surface 11b of the ribbon-shaped film 11 is not exposed in the inner surface of the tire but the ribbon-shaped elastomer ply 13, that is not easily subjected to blemishes, is exposed. Therefore, occurrence of blemishes in the inner surface of the tire is avoided after curing, enabling an inner appearance of the tire to be improved.

In the alternative of the structure shown in FIG. 2, the laminated body 14 may be arranged such that the other ribbon-shaped elastomer ply 13 is less in width than the ribbon-shaped film 11, the one ribbon-shaped elastomer ply 12 has the same width as the ribbon-shaped film 11, and the one end of the one ribbon-shaped elastomer ply 12 and the other end of the ribbon-shaped film 11 are spliced to each other in a directly overlapping manner (structure up side down in FIG. 2).

Figure 3:
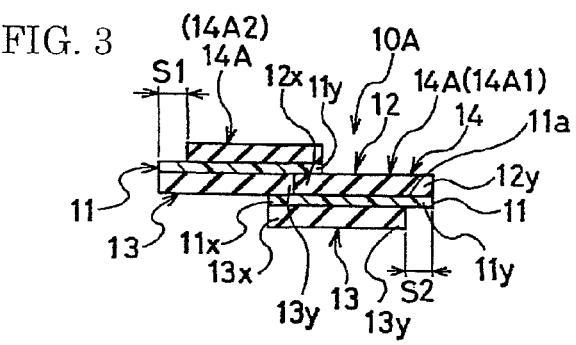
FIG. 3 is a partial enlarged cross-sectional view of another example of the air impermeable layer.

Referring to FIG. 3, there is shown another example of the air impermeable layer described above. In the laminated body 14 constituting this air impermeable layer 10A, one ribbon-shaped elastomer ply 12 and the other ribbon-shaped elastomer ply 13 are less in width than the ribbon-shaped film 11. The one ribbon-shaped elastomer ply 12 has the same width as the other ribbon-shaped elastomer ply 13.

The ribbon-shaped film 11 is laminated on the other ribbon-shaped elastomer ply 13 in such a manner that the one end 11x of the ribbon-shaped film 11 is located on the one end 13x of the other ribbon-shaped elastomer ply 13. The other end 13y of the other ribbon-shaped elastomer ply 13 is offset inward in the widthwise direction of the laminated body 14 relative to the other end 11y of the ribbon-shaped film 11. The one ribbon-shaped elastomer ply 12 is laminated on the outer surface 11a of the laminated ribbon-shaped film 11 in such an entirely overlapping manner that the other end 12y is located on the other end 11y of the ribbon-shaped film 11 and the one end 12x is offset inward in the widthwise direction of the laminated body 14 relative to the one end 11x of the ribbon-shaped film 11. The other ribbon-shaped elastomer ply 13 is located inward of the ribbon-shaped film 11, and faces the cavity 9 of the tire.

Each pair of adjacent wound portions 14A1 and 14A2 of the laminated body 14 are partially overlapped with each other in a state where the one end 11x of the ribbon-shaped film 11 and the other end 13y of the other ribbon-shaped elastomer ply 13, and the one end 12x of the one ribbon-shaped elastomer ply 12 and the other end 11y of the ribbon-shaped film 11 are spliced to each other in a directly overlapping manner, respectively, and the one end 11x and the other end 11y of the ribbon-shaped film 11 are disengaged from each other. When viewed from the tire inner side, the ribbon-shaped film 11 is placed such that the one end 11x and the other end 11y disengaged from each other are overlapped with each other, whereby air is not easily permeated between the ends 11x and 11y of the ribbon-shaped film 11. This structure also can provide the same effects as the above.

Referring to FIGS. 4 to 7, there are shown still another examples of the air impermeable layer described above. These air impermeable layers 10B, 10C, 10D and 10E are each arranged such that the one end 11x and the other end 11y of the ribbon-shaped film 11 are disengaged from each other and at least the one end of either of the two ribbon-shaped elastomer plies 12 and 13 and the other end of either of the two ribbon-shaped elastomer plies 12 and 13 are spliced to each other in an overlapping manner.

Figure 4:
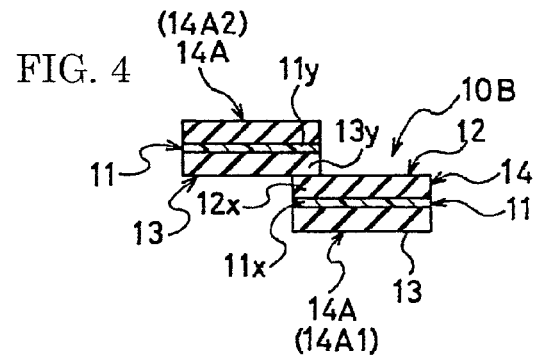
FIG. 4 is a partial enlarged cross-sectional view of still another example of the air impermeable layer.

In the air impermeable layer 10B of FIG. 4, the ribbon-shaped elastomer plies 12 and 13 laminated on the opposite sides of the ribbon-shaped film 11 have the same width as the ribbon-shaped film 11, and the ribbon-shaped film 11 and the ribbon-shaped elastomer plies 12 and 13 are laminated in an entirely overlapping mariner without offset to form a laminated body 14. The other ribbon-shaped elastomer ply 13 is located inward of the ribbon-shaped film 11, and faces the cavity 9 of the tire.

Each pair of adjacent wound portions 14A1 and 14A2 of the laminated body 14 are partially overlapped with each other in a state where the one end 12x of the one ribbon-shaped elastomer ply 12 and the other end 13y of the other ribbon-shaped elastomer ply 13 are spliced to each other in a directly overlapping manner and the one end 11x and the other end 11y of the ribbon-shaped film 11 are disengaged from each other. When viewed from the tire inner side, the ribbon-shaped film 11 is placed such that the one end 11x and the other end 11y are overlapped with each other, whereby air is not easily permeated between the ends 11x and 11y of the ribbon-shaped film 11.

Figure 5:
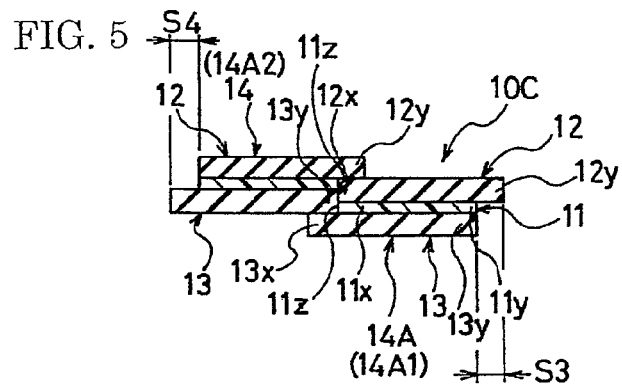
FIG. 5 is a partial enlarged cross-sectional view of still another example of the air impermeable layer.

In the air impermeable layer 10C of FIG. 5, the ribbon-shaped elastomer plies 12 and 13 laminated on the opposite sides of the ribbon-shaped film 11 are greater in width than the ribbon-shaped film 11. One ribbon-shaped elastomer ply 12 is offset toward the other side of the laminated body 14 in the widthwise direction thereof with respect to the ribbon-shaped film 11 in such a manner that the one end 12x of the one ribbon-shaped elastomer ply 12 is overlapped with the one end 11x of the ribbon-shaped film 11 and the other end 12y of the one ribbon-shaped elastomer ply 12 projects outward of the other end 11y of the ribbon-shaped film 11.

The other ribbon-shaped elastomer ply 13 is offset toward the one side of the laminated body 14 in the widthwise direction thereof with respect to the ribbon-shaped film 11 in such a mariner that the other end 13y of the other ribbon-shaped elastomer ply 13 is overlapped with the other end 11y of the ribbon-shaped film 11 and the one end 13x of the other ribbon-shaped elastomer ply 13 projects outward of the one end 11x of the ribbon-shaped film 11. The other ribbon-shaped elastomer ply 13 is located inward of the ribbon-shaped film 11, and faces the cavity 9 of the tire.

Each pair of adjacent wound portions 14A1 and 14A2 of the laminated body 14 are partially overlapped with each other in a state where the one end 12x and the other end 12y of the one ribbon-shaped elastomer ply 12 are spliced to each other in a directly overlapping manner, the one end 13x and the other end 13y of the other ribbon-shaped elastomer ply 13 are spliced to each other in a directly overlapping manner and the one end 11x and the other end 11y of the ribbon-shaped film 11 are disengaged from each other.

Figure 6:
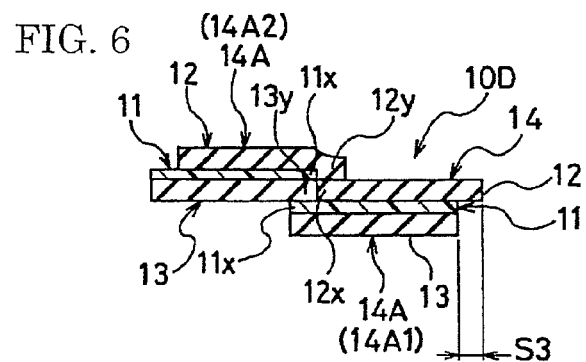
FIG. 6 is a partial enlarged cross-sectional view of still another example of the air impermeable layer.

In the air impermeable layer 10D of FIG. 6, the ribbon-shaped elastomer plies 12 and 13 laminated on the opposite sides of the ribbon-shaped film 11 have the same width as the ribbon-shaped film 11. The laminated body 14 is formed by laminating the ribbon-shaped film 11 on the other ribbon-shaped elastomer ply 13 in an entirely overlapping manner without offset and by laminating the one ribbon-shaped elastomer ply 12 on the laminated ribbon-shaped film 11 with offset toward the other side of the laminated body 14 in the widthwise direction thereof. The other ribbon-shaped elastomer ply 13 is located inward of the ribbon-shaped film 11, and faces the cavity 9 of the tire.

Each pair of adjacent wound portions 14A1 and 14A2 of the laminated body 14 are partially overlapped with each other in a state where the one end 12x and the other end 12y of the one ribbon-shaped elastomer ply 12 are spliced to each other in a directly overlapping manner, the one end 11x of the ribbon-shaped film 11 and the other end 13y of the other ribbon-shaped elastomer ply 13 are spliced to each other in a directly overlapping manner and the one end 11x and the other end 11y of the ribbon-shaped film 11 are disengaged from each other. When viewed from the tire inner side, the ribbon-shaped film 11 is placed such that the one end 11x and the other end 11y disengaged from each other are overlapped with each other, whereby air is not easily permeated between the ends 11x and 11y of the ribbon-shaped film 11.

Figure 7:
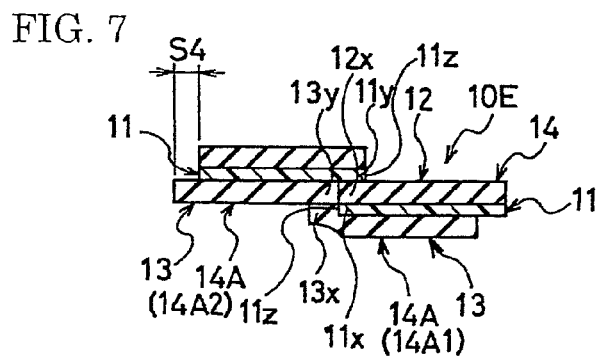
FIG. 7 is a partial enlarged cross-sectional view of still another example of the air impermeable layer.

In the air impermeable layer 10E of FIG. 7, the ribbon-shaped elastomer plies 12 and 13 laminated on the opposite sides of the ribbon-shaped film 11 have the same width as the ribbon-shaped film 11. The laminated body 14 is formed such that the one ribbon-shaped elastomer ply 12 and the ribbon-shaped film 11 are laminated with each other in an entirely overlapping manner and the other ribbon-shaped elastomer ply 13 is offset toward the one side of the laminated body 14 in the widthwise direction thereof with respect to the ribbon-shaped film 11. The other ribbon-shaped elastomer ply 13 is located inward of the ribbon-shaped film 11, and faces the cavity 9 of the tire.

Each pair of adjacent wound portions 14A1 and 14A2 of the laminated body 14 are partially overlapped with each other in a state where the one end 13x and the other end 13y of the other ribbon-shaped elastomer ply 13 are spliced to each other in a directly overlapping manner, the one end 12x of the one ribbon-shaped elastomer ply 12 and the other end 11y of the ribbon-shaped film 11 are spliced to each other in a directly overlapping manner and the one end 11x and the other end 11y of the ribbon-shaped film 11 are disengaged from each other. When viewed from the tire inner side, the ribbon-shaped film 11 is placed such that the one end 11x and the other end 11y disengaged from each other are overlapped with each other, whereby air is not easily permeated between the ends 11x and 11y of the ribbon-shaped film 11.

The air impermeable layers structured as shown in FIGS. 4 to 7 also can provide the same effects as the above.

The air impermeable layers 10C, 10D and 10E shown in FIGS. 5 to 7 are better than the air impermeable layer 10B shown in FIG. 4 in terms of thickness of the spliced portion. The air impermeable layers 10C and 10E shown in FIGS. 5 and 7 are more preferable because opposite edges 11z of the ribbon-shaped film 11 are not exposed to the cavity 9 of the tire, either.

In the embodiments shown in FIGS. 2 and 3 of the present invention, the offset amount S1 between the one end 11x of the ribbon-shaped film 11 and the one end 12x of the one ribbon-shaped elastomer ply 12 is preferably at least 2 mm. If the offset amount S1 is less than 2 mm, it is not preferable because the overlapping length of the ribbon-shaped film 11 and the other ribbon-shaped elastomer ply 13 is so little that a possibility of invasion of the mold release agent inside increases. The offset amount S2 between the other end 11y of the ribbon-shaped film 11 and the other end 13y of the other ribbon-shaped elastomer ply 13 can be the same as the offset amount S1 for the same reason.

If the offset amount S1, S2 becomes greater, the overlapping length is greater, and a possibility of invasion of the mold release agent inside decreases; however, as more materials constituting the laminated body 14 are used, waste of the materials is greater. However, if the offset amount S1, S2 becomes greater, the overlapping length is greater, and there is also an advantage of obtaining a tire from which air is not easily leak. Accordingly, considering these, the upper limit of the offset amount S1, S2 can be properly selected as necessary. From the viewpoint of reducing waste of the materials of the overlapping portions, the upper limit of the offset amount S1, S2 is preferably equal to or less than 0.5 times the width W of the ribbon-shaped film 11.

In the embodiments shown in FIGS. 5 to 7, the offset amount S3 of the one ribbon-shaped elastomer ply 12 and the offset amount S4 of the other ribbon-shaped elastomer ply 13 can be the same as the offset amount S1 for the same reason.

The width W of the ribbon-shaped film 11 is preferably in the range of 5 mm to 70 mm. If the width W is less than 5 mm, the laminated body 14 is apt to undergo elongation, which makes it difficult to wind the laminated body 14 when a tire is produced. If the width W of the ribbon-shaped film 11 is beyond 70 mm, the laminated body 14 also has a width beyond 70 mm. Therefore, it is not preferable from the viewpoint of uniformity around the circumference because the laminated body has portions greatly protruding from a winding area required in a winding-starting region and a winding-finishing region of the laminated body 14.

It is preferable in terms of fabrication that the air impermeable layer 10 be formed by winding one laminated body 14 as described above. However, the above-described air impermeable layer 10 may be formed using a plurality of laminated bodies 14. The laminated body 14 having a three-layer structure is exemplified. However, the number of the elastomer layers may increase as necessary. It is sufficient for the laminated body 14 to have a structure of laminating at least two ribbon-shaped elastomer layers on the opposite sides of the ribbon-shaped film 11.

INDUSTRIAL APPLICABILITY

The present invention having the aforementioned excellent effects is preferably applied to a pneumatic tire in which a film formed of a thermoplastic resin or thermoplastic elastomer composition comprising a blend of a thermoplastic resin and an elastomer is used for an air impermeable layer.

What is claimed is:

1. A pneumatic tire having an air impermeable layer disposed on an inner side of the tire, the air impermeable layer being formed of a thermoplastic resin or thermoplastic elastomer composition comprising a blend of a thermoplastic resin and an elastomer, wherein:

the air impermeable layer is formed from a laminated body comprising a ribbon-shaped film and at least two ribbon-shaped elastomer plies laminated on opposite sides thereof, the laminated body being wound in a circumferential direction of the tire in such a partially overlapping manner that it is displaced at prescribed intervals;

the ribbon-shaped film and the at least two ribbon-shaped elastomer plies each have opposite ends comprising one end on one side of the laminated body in a widthwise direction thereof and the other end on the other side of the laminated body in the widthwise direction thereof;

each pair of adjacent wound portions of the laminated body are spliced to each other in a partially overlapping manner in a state where the ribbon-shaped film is disengaged from itself, each pair of adjacent wound portions of the laminated body are partially overlapped with each other in a state where the one end of any one of the at least two ribbon-shaped elastomer plies and the other end of any one of the at least two ribbon-shaped elastomer plies are spliced to each other in an overlapping manner, the at least two ribbon-shaped elastomer plies are greater in width than the ribbon-shaped film;

one ribbon-shaped elastomer ply of the at least two ribbon-shaped elastomer plies is laminated on the ribbon-shaped film so as to be offset toward the other side of the laminated body in the widthwise direction thereof with respect to the ribbon-shaped film;

the other ribbon-shaped elastomer ply of the at least two ribbon-shaped elastomer plies is laminated on the ribbon-shaped film so as to be offset toward the one side of the laminated body in the widthwise direction thereof with respect to the ribbon-shaped film; and each pair of adjacent wound portions of the laminated body are partially overlapped with each other in a state where the one end and the other end of the one ribbon-shaped elastomer ply are spliced to each other in a directly overlapping manner, and where the one end and the other end of the other ribbon-shaped elastomer ply are spliced to each other in a directly overlapping manner.

2. The pneumatic tire according to claim 1, wherein an offset amount of the one ribbon-shaped elastomer ply is at least 2 mm.

3. The pneumatic tire according to claim 1, wherein an offset amount of the other ribbon-shaped elastomer ply is at least 2 mm.

4. The pneumatic tire according to claim 1, wherein the ribbon-shaped film has a width of 5 mm to 70 mm.

* * * * *